US006555259B1

(12) United States Patent
Carpenter et al.

(10) Patent No.: US 6,555,259 B1
(45) Date of Patent: Apr. 29, 2003

(54) CATALYTIC GENERATION OF HYDROGEN

(75) Inventors: Ian William Carpenter, Bristol (GB); John William Hayes, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/646,744

(22) PCT Filed: Mar. 22, 1999

(86) PCT No.: PCT/GB99/00744

§ 371 (c)(1),
(2), (4) Date: Dec. 29, 2000

(87) PCT Pub. No.: WO99/48804

PCT Pub. Date: Sep. 30, 1999

(30) Foreign Application Priority Data

Mar. 24, 1998 (GB) .............................................. 9806198

(51) Int. Cl.⁷ .............................. C01B 3/22; H01M 8/04
(52) U.S. Cl. ....................... 429/17; 423/648.1
(58) Field of Search ................. 423/650, 651, 423/652, 648.1; 429/17

(56) References Cited

U.S. PATENT DOCUMENTS

| | | | | |
|---|---|---|---|---|
| 4,431,750 A | * | 2/1984 | McGinnis et al. ........... | 502/329 |
| 4,743,576 A | | 5/1988 | Schneider et al. | |
| 4,859,434 A | | 8/1989 | Roberts et al. | |
| 5,614,163 A | * | 3/1997 | Bhattacharyya et al. . | 423/648.1 |
| 5,626,794 A | | 5/1997 | Bhattacharyya et al. | |
| 5,741,474 A | | 4/1998 | Isomura et al. | |
| 5,837,217 A | * | 11/1998 | Nielsen et al. ........... | 423/648.1 |
| 6,361,757 B1 | * | 3/2002 | Shikada et al. ............. | 423/651 |
| 6,376,423 B2 | * | 4/2002 | Yagi et al. .................. | 423/651 |

FOREIGN PATENT DOCUMENTS

| | | |
|---|---|---|
| EP | 0 217 532 | 4/1987 |
| EP | 0 262 947 | 4/1988 |
| EP | 0 754 649 | 1/1997 |
| GB | 2 085 314 | 4/1982 |
| WO | 96/00186 | 1/1996 |
| WO | 96/18573 | 6/1996 |

OTHER PUBLICATIONS

British Search Report dated Jun. 11, 1998.
International Search Report dated Jul. 5, 1999.
Jenkins, J.W. and Shutt, E., "The Hot Spot™ Reactor: Hydrogen Generation Using a Novel Concept," *Platininum Metals Rev.*, 1989, vol. 33, No. 3, pp. 118–127.
Vernon et al, "Partial Oxidation of Methane to Synthesis Gas, " *Catalysis Letters*, vol. 6 (1990) 181–186. (no month).*

* cited by examiner

*Primary Examiner*—Wayne A. Langel
(74) *Attorney, Agent, or Firm*—RatnerPrestia

(57) ABSTRACT

A process for the catalytic generation of hydrogen by the self-starting, self-sustaining combination of partial oxidation and steam reforming of an organic fuel wherein a mixture of the organic fuel and an oxygen-containing gas and steam is contacted with a precious metal catalyst which is selective for the partial oxidation reaction characterized in that the organic fuel is dimethyl ether. Suitable catalysts include platinum or rhodium supported on zirconia or a mixture of ceria and zirconia.

10 Claims, No Drawings

CATALYTIC GENERATION OF HYDROGEN

This application is the U.S. national-phase application of PCT International Application No. PCT/GB99/00744.

This invention relates to the catalytic generation of hydrogen.

Hydrogen is currently used mainly in industry, in activities such as the manufacture of fertilisers, petroleum processing, methanol synthesis, annealing of metals and producing electronic materials. In the foreseeable future, the emergence of fuel cell technology will extend the use of hydrogen to domestic and vehicle applications.

A fuel cell works best when the anode is supplied with neat hydrogen. In the design of practical systems, however, other factors also need to be considered, including the availability, cost, supply, distribution, storage and release of clean hydrogen. When all these factors are taken into consideration, alternative methods of fueling can show an overall advantage.

New fuel-processing technologies for generating hydrogen tend to be based either on steam-reforming or on partial oxidation. Each approach has its merits. Partial oxidation is a fast exothermic process, resulting in rapid start-up and short response times. Steam reforming is endothermic and very efficient, producing hydrogen from both the fuel and the steam.

However, our work on system simulations leads us to predict that, in terms of efficiency, the ideal fuel-processor is likely to function by a combination of partial oxidation and steam reforming. In our previous work, (see EP 0217532; EP 0262947; WO 96/00186 and Platinum Metals Review, 1989, 33 (3) 118–127), we have shown that the two reactions can be carried out simultaneously in the same catalyst bed using a catalytic hydrogen generator which has become known as the HotSpot™ reactor. The process which takes place in the HotSpot reactor is a self-sustaining combination of exothermic partial oxidation and endothermic steam-reforming to produce a gas-stream containing mainly hydrogen, carbon dioxide and nitrogen, and is characterised by a low rate of carbon monoxide formation. WO 96/00186 teaches that the organic fuel can be an oxygenate, e.g. methanol.

Possibly, the easiest fuel to process is methanol. However, because of certain disadvantages of methanol, it is by no means certain that methanol will be widely adopted for fuel cell vehicle and domestic applications.

An object of the present invention is to provide an improved process for generating hydrogen by oxidatively reforming (ie by partial oxidation alone or with the combination of steam reforming) of an organic fuel.

According to the present invention there is provided a process for the catalytic gene ration of hydrogen by the self-starting, self-sustaining oxidation of an organic fuel wherein a mixture of the organic fuel and an oxygen-containing gas and optionally steam is contacted with a precious metal catalyst which is selective for the oxidative reforming of organic fuels characterised in that the organic fuel comprises dimethyl ether.

Preferably, steam is introduced into the mixture of dimethyl ether and oxygen-containing gas after the self-starting, self-sustaining partial oxidation of the dimethyl ether has commenced.

Further preferably, the oxygen-containing gas is air.

A suitable catalyst for the process of the invention is platinum or rhodium supported on zirconia or a mixture of ceria and zirconia.

Preferably, platinum or rhodium comprises 0.1 weight % to 5 weight % of the total weight of the supported catalyst.

Further preferably, the weight ratio of ceria to zirconia in the catalyst support material is from 0.5 to 99.5 to 99.5 to 0.5.

The present invention is also the use in a fuel cell system of a process for the generation of hydrogen as defined herein.

An advantageous feature of the process of the present invention is that it provides for a highly compact and responsive fuel processing unit characterised by the absence of separate or integral shift reactors.

As an alternative to methanol, dimethyl ether (DME) has several further advantages, namely:
(i) it has much lower toxicity;
(ii) it is less hygroscopic, making it less corrosive;
(iii) it has a higher energy density; and
(iv) although a gas at ambient temperatures. it is easy to liquify.

Furthermore, as dimethyl ether has a high cetane number and combusts cleanly, it is being assessed as an alternative to conventional diesel fuel. Should this happen, it can be expected to become much more widely available than methanol.

Dimethyl ether can be used either as a fuel in its own right or as a promoter for liquified hydrocarbon fuels (eg LPG) that are more difficult to convert to hydrogen. The dimethyl ether promotes start-up from ambient temperature.

The present invention is further described by way of the following illustrative Examples.

EXAMPLE 1

A batch of catalyst with a nominal composition of 1%Pt/$ZrO_2$ (based on the proportions of precursors) was made by impregnating 20 g of zirconia. The impregnating solution was prepared by dissolving 0.4 g tetraammineplatinum(II) hydrogencarbonate in 16 $cm^3$ of citric acid (100 g $l^{-1}$).

The impregnating solution was added to the support material, and mixed thoroughly. The resultant paste was dried at 120° C. for 8 hours, before being calcined in static air at 500° C. for 2 hours. Finally, the catalyst was crushed and sieved. No special activation was required prior to testing.

A small bed (0.2 g) of the catalyst was loaded into a tubular quartz reactor, which was positioned at the centre of a tubular furnace. A mixture of gas-phase DME (5 standard $cm^3$ $min^{-1}$) and air (11 $cm^3$ $min^{-1}$) was passed through the catalyst bed, while the temperature inside the furnace was raised at 2° C. $min^{-1}$. As partial oxidation started to occur as soon as the gas stream came into contact with the catalyst, the $H_2O$ feed stream (steam: 31 $cm^3$ $min^{-1}$, nitrogen: 112 $cm^3$ $min^{-1}$) was turned on almost immediately (within 10 seconds of starting).

The rate of hydrogen production was highest when the catalyst bed temperature reached 370° C. At this temperature, the product gas-stream contained 18% $H_2$, 6.6% $CO_2$, 1.3% CO, 4% $CH_4$ and 65% $N_2$ (plus water). The reaction was self-sustaining, with hydrogen production continuing even when the furnace was switched off.

EXAMPLE 2

A batch of catalyst with a nominal composition of 1%Rh/$CeO_2$—$ZrO_2$ (based on the proportions of precursors) was prepared by impregnating 50 g of 50:50 (by mass) ceria-zirconia support material with an aqueous Rh-salt solution. The impregnating solution (30 $cm^3$) was prepared by adding distilled water to 3.64 g of aqueous rhodium(III) nitrate (from Johnson Matthey) containing 0.5 g rhodium.

The impregnating solution was added to the support material, and mixed thoroughly. Excess water was removed from the edge of the resultant paste, which was then left for 2 hours to form a semi-rigid cake. After breaking-up the cake, the lumps were dried at 120° C. for 8 hours, before being calcined in static air at 500° C. for 2 hours. Finally, the catalyst was crushed and sieved. No special activation was required prior to testing.

A small bed (0.2 g) of the catalyst was loaded into a tubular quartz reactor, which was positioned at the centre of a tubular furnace. A mixture of gas-phase DME (6.5 standard cm$^3$ min$^{-1}$) and air (11 cm$^3$ min$^{-1}$) was passed through the catalyst bed, while the temperature inside the furnace was raised at 2° C. min$^{-1}$. As in Example 1, partial oxidation started to occur as soon as the gas stream came into contact with the catalyst, and so the H$_2$O feed (steam: 31 cm$^3$ min$^{-1}$, nitrogen: 112 cm$^3$ min$^{-1}$) was turned on almost immediately (within 10 seconds of starting).

The rate of hydrogen production was highest when the catalyst bed temperature reached 540° C. At this temperature, the product gas-stream contained 21% H$_2$, 4.7% CO$_2$, 2.1% CO, 1% CH$_4$ and 69% N$_2$ (plus water). The reaction was self-sustaining, with hydrogen production continuing even when the furnace was switched off

What is claimed is:

1. A process for the catalytic generation of hydrogen by the self-starting, self-sustaining oxidation of an organic fuel wherein a mixture of the organic fuel and an oxygen-containing gas is contacted with a precious metal catalyst which is selective for the oxidative reforming of organic fuels characterised in that the organic fuel comprises dimethyl ether and the catalyst is platinum or rhodium supported on zirconia or a mixture of ceria and zirconia.

2. A process according to claim 1 wherein platinum or rhodium comprises 0.1 weight % to 5 weight % of the total weight of the supported catalyst.

3. A process according to claim 1 wherein the weight ratio of ceria to zirconia in the catalyst support material is from 0.5 to 99.5 to 99.5 to 0.5.

4. A process claimed in claim 1 wherein the organic fuel further comprises a second fuel which is more difficult to convert to hydrogen than dimethyl ether and dimethyl ether is present in the mixture as an initiator for the self-starting, self-sustaining oxidation reaction.

5. A process as claimed in claim 4 wherein the second fuel is a liquified hydrocarbon.

6. A process as claimed in claim 1 wherein the self-starting, self-sustaining oxidation reaction is initiated at ambient temperature.

7. A process as claimed in claim 1 further comprising supplying the hydrogen that is generated to a fuel cell.

8. A process as claimed in claim 1, wherein the mixture further comprises steam.

9. A process according to claim 1, wherein steam is introduced into the mixture of dimethyl ether and the oxygen-containing gas after the self-starting, self-sustaining partial oxidation of the dimethyl either has commenced.

10. A process according to claim 1, wherein the oxygen-containing gas is air.

* * * * *